United States Patent

Bliault et al.

[11] Patent Number: 6,078,031
[45] Date of Patent: Jun. 20, 2000

[54] METHOD AND DEVICE FOR JOINING OILFIELD TUBULARS

[75] Inventors: Alan Edgar John Bliault, Hague; Francis Alexander Cumming; Mark Seth Laws, both of Rijswijk, all of Netherlands

[73] Assignee: Shell Research Limited, United Kingdom

[21] Appl. No.: 09/331,934

[22] PCT Filed: Feb. 3, 1998

[86] PCT No.: PCT/EP98/00647

§ 371 Date: Jun. 29, 1999

§ 102(e) Date: Jun. 29, 1999

[87] PCT Pub. No.: WO98/33619

PCT Pub. Date: Aug. 6, 1998

[30] Foreign Application Priority Data

Feb. 4, 1997 [EP] European Pat. Off. .............. 97200304

[51] Int. Cl.[7] .............................. H05B 6/10; B23K 13/02
[52] U.S. Cl. .......................... 219/607; 219/611; 219/615; 219/616; 219/647; 228/220
[58] Field of Search ..................... 219/607, 611, 219/614, 603, 616, 617, 615, 635, 647; 228/194, 193, 212, 220

[56] References Cited

U.S. PATENT DOCUMENTS

| | | | |
|---|---|---|---|
| 2,649,527 | 8/1953 | Chapman et al. | 219/611 |
| 2,730,599 | 1/1956 | Ronay | 219/611 |
| 3,603,759 | 9/1971 | Peacock | 219/611 |
| 4,026,583 | 5/1977 | Gottlieb | 285/55 |
| 4,084,739 | 4/1978 | Koltz et al. | 228/168 |
| 5,118,028 | 6/1992 | Ogawa et al. | 228/194 |

FOREIGN PATENT DOCUMENTS

| | | |
|---|---|---|
| 0 396 204 | 6/1988 | European Pat. Off. . |
| WO 88/03853 | 6/1988 | WIPO . |

Primary Examiner—Philip H. Leung

[57] ABSTRACT

A method for joining well and other oilfield tubulars by amorphous bonding comprises the steps of positioning a body of amorphous material (16) between adjacent and surfaces of a pair of oilfield tubulars (3, 4) that are to be joined and using induction heating to melt the amorphous material and create on cooling a metallurgical bond between the tubulars (3, 4). Throughout the heating and bonding process the tubulars (3, 4) are fixed in axial alignment with each other using clamp means which include a mandrel (1) which is inserted into the interior of the tubulars (3, 4) so that the bonding process can be performed in a sealed chamber (17, 18) which is filled with an inert gas.

7 Claims, 1 Drawing Sheet

METHOD AND DEVICE FOR JOINING OILFIELD TUBULARS

FIELD OF THE INVENTION

The invention relates to a method and device for joining oilfield tubulars. Oilfield tubulars that are used within oil and/or gas production wells include reeled systems, coiled tubing, expandable slotted tubing (EST), expandable tubing, accessories to well tubulars and drill pipes. Oilfield tubulars that are used outside a well are offshore and onshore pipelines for the transport of crude oil and/or natural gas, risers that extend between the waterbottom and a platform deck, and tethers for mooring tension leg platforms.

During drilling and completion of an oil or gas production or fluid or heat injection well, elongate strings of well tubulars and accessories have to be inserted into the well to drill the well and protect the well against caving in and to facilitate a safe production of oil and gas through the well. The conventional way of protecting a well against caving in is to create a casing by screwing together one or more strings of casing pipes that are lowered into the well and cemented in place. Production of oil and gas takes place via one or more elongate production strings, consisting of production tubes that are interconnected by screw thread couplings, which production strings are suspended within the interior of the casing.

BACKGROUND OF THE INVENTION

Accordingly the conventional procedure for drilling and completing a well requires many hundreds of screw thread connections to be made. Making up of these connections at the drilling floor is a time consuming procedure and it requires use of carefully machined well tubulars.

A significant problem with the conventional screw thread connections is that if the wall strength at the location of the joint needs to be similar to that of the rest of the tubular the accumulated wall thickness of the pipes at the location of the joint needs to be significantly more than that of the rest of the pipe. The presence of such bulbs at the locations of the joints and the requirement that the string of tubulars must be lowered into the well leads to the requirement of a significant spacing between the external pipe wall and the internal wall of a surrounding tubular such as a casing or the borehole wall. For conventional production tubings with male screw thread joints having a larger outer diameter than the rest of the tubing operational requirements normally require that the minimum spacing between the casing and nominal tubing size is at least 2 cm at each side of the tubing wall. This requirement leads to a significant unused annular space around the production tubing and thus to a reduced production capacity of the well or an increased well size.

It is observed that it is known in the art to use well tubulars with internally and externally flush screw thread connections. A disadvantage of these connections is that they form weak spots with a significantly lower strength than the rest of the pipe.

Safety requirements and explosion hazards at oil or gas wellheads limit the possibility of welding operations. It is known from European patent specification 396204 to safely weld well tubulars together using a friction welding technique where a ring is rotated at high speed while the tubing ends are pressed onto the ring. Disadvantages of the known friction welding technique are, however, that it is difficult to accurately control the temperature and that the ring and pipe ends will often deform which leads to irregular inner and outer surfaces at the location of the joint. The joint therefore often has to brought into a required regular shape by pulling an expansion mandrel therethrough and/or by machining away any wire edges and other irregularities.

BRIEF SUMMARY OF THE INVENTION

The present invention aims to provide a method and device for joining well and other oilfield tubulars and accessories thereof in an efficient and safe manner.

The device should be easily movable such that it can be mounted on a drilling, workover or other oilfield rig, such as a pipelaying vessel. The method should be able to be performed by drilling operators without broad expertise of welding technology, while use can be made of existing hoisting and rig equipment.

The method for joining well tubulars according to the invention comprises the steps of:

lowering a first tubular element into a well until the upper end of the element is located in a substantially vertical orientation near the entrance of the well, hoisting a second tubular element to a substantially vertical position above the first tubular element, positioning a body of amorphous material between the adjacent end surfaces of said first and second tubular element, fixing the tubular elements in axial alignment with each other using clamp means which include an internal mandrel which is inserted into the interior of the first and second tubular element, placing an induction coil and seal mechanism adjacent the end surfaces to be joined, flushing the area to be joined with an inert gas, inducing the clamp means to press the end surfaces of said tubular elements against the body of amorphous material to ensure intimate contact between said end surfaces and amorphous material, activating the induction coil to melt the amorphous material and create a metallurgical bond between the tubular elements, releasing the clamp means and seal mechanism, and lowering the interconnected tubular elements into the well.

The device for joining well tubulars according to the invention comprises:

means for maintaining a first tubular element in a substantially vertical position suspended in a well while the upper end of the element is located near the entrance of the well, means for hoisting a second tubular element to a substantially vertical position above the suspended first tubular element, means for fixing said tubular elements in axial alignment with each other, means for positioning amorphous material between the adjacent end surfaces of said tubular elements, an induction coil and seal mechanism arranged adjacent to the adjacent end surfaces of the tubular elements means for purging the area to be bonded with inert gas and for activating the induction coil to melt the amorphous material, thereby creating a metallurgical bond between the tubular elements on cooling, and means for lowering the interconnected tubular elements into the well.

The substantially vertical orientation of the tubular elements during the amorphous bonding process according to the invent-ion has the advantage that the upper end of the first tubular element, which is suspended in the well, can be firmly fixed near the drilling floor whereupon the second tubular element can be hoisted on top of the first element by means of e.g. a crown block of the drilling rig so that the amorphous bonding process can be carried out with a relatively small mobile bonding device which does not require a heavy foundation frame.

It is preferred that during the amorphous bonding process according to the invention the interior and exterior of the tubular elements in the region of the amorphous ring are purged with inert gas. In general it is preferred that this is achieved by providing a sealed chamber externally around the area to be bonded and introducing the inert gas prior to initiating the heating cycle. It is also preferred that the interior of the tubular elements will be sealed during the purging/sealing process by arranging cup seals on a mandrel which is positioned inside the tubular elements during the welding process which has the additional benefit that contact between the heating elements, heat affected zones and any flammable gases that may escape form the well will be avoided. Preferably the mandrel is further equipped with a pair of clamps that are positioned opposite to the external clamps on the tubing end sections so that during the bonding process the tubular elements are clamped between the pairs of internal and external clamps which allows a high contact pressure to be exerted by the clamps to the tubular elements without the risk of deformation or rupture of these elements.

The present invention also relates to a method and a device for joining oilfield tubulars for use outside a hydrocarbon fluid production well. Examples of such tubulars are pipelines for the transport of crude oil and/or gas, offshore risers and tethers for mooring tension leg platforms.

The method according to the invention for joining oilfield tubulars for use outside a hydrocarbon fluid production well comprises the steps of:

positioning a body of amorphous material between adjacent end surfaces of a pair of oilfield tubulars that are to be joined;

arranging an amorphous bonding device near said end surfaces, which device is equipped with an induction coil and with clamp, seal and inert gas injection mechanisms;

inducing the clamp mechanism, which includes a mandrel that is inserted into the interior of the tubulars, to press the end surfaces against the body of amorphous material and such that the end surfaces are maintained in an accurately defined axially aligned position relative to each other;

activating the seal mechanism to create a sealed chamber that encapsulates the end surfaces and the body of amorphous material;

activating the inert gas injection mechanism to fill the sealed chamber with an inert gas;

activating the induction coil to heat the body of amorphous material such that it melts and on cooling a metallurgical bond is created between the end surfaces of the tubulars;

allowing the joined tubulars to cool down;

releasing the clamp and seal mechanisms; and removing the joined tubulars from the amorphous bonding device.

The device according to the invention for joining oilfield tubulars for use outside a hydrocarbon production well comprises a clamp mechanism, which includes a mandrel that is insertable into the interior of the tubulars, to press the end surfaces against a body of amorphous material between the tubulars such that the end surfaces are maintained in an accurately defined axially aligned position relative to each other;

a seal mechanism for creating a sealed chamber that encapsulates the end surfaces and the body of amorphous material;

an inert gas injection mechanism for filling the sealed chamber with inert gas;

an induction heating coil for heating the body of amorphous material such that it melts and on cooling a metallurgical bond is created between the end surfaces of the tubulars; and means for moving the tubulars into and from the device.

For oilfield tubulars that are joined in a vertical arrangement, such as tethers, risers and pipelines layed with the J-shape pipelaying technique, the handling and hoisting equipment is similar to the equipment used for handling well tubulars.

For oilfield tubulars that are joined in a non-vertical arrangement the tubulars are preferably moved into and from the device using a ramp or rolling guide assembly.

The method and device according to the invention are applicable to all pipe sizes used in well and other oilfield tubulars and can be applied to all materials conventionally used for well and other oilfield tubulars, including carbon steels, high chromium alloys such as 13 Cr, 22 Cr and 25 Cr, titanium and non-corrosion resistant metals.

It is observed that U.S. Pat. No. 5,118,028 discloses a diffusion bonding method solely for corrosion resistant materials that may be used in thermal and nuclear power stations and in chemical plants.

As shown in FIG. 1 of this prior art reference shielding gas, such as nitrogen, is injected throughout the interior of the tubulars that are interconnected by diffusion bonding. The absence of an internal mandrel and other equipment to accurately position the tubulars in a vertical arrangement makes this known diffusion bonding method unsuitable for interconnecting well tubulars.

In the method and device according to the present invention the internal mandrel is essential to reduce the risk of damage to the interconnected tubular elements by the external clamp means of the bonding device. It will be understood that the string of well tubulars that is suspended into the well may have a length of several kilometres and that on a floating or other offshore rig the wellhead may make oscillating movements which require clamp means that are able to exert extremely high clamping forces to the tubular elements in order to properly fix the adjacent tubular ends against each other during the amorphous bonding process.

These and other aspects, features, objects and advantages of the method and device according to the invention are disclosed in the accompanying claims, abstract and drawing.

BRIEF DESCRIPTION OF THE DRAWINGS

The invention will now be described in more detail by way of example with reference to the accompanying schematic drawing.

DETAILED DESCRIPTION OF THE INVENTION

Figure 1:
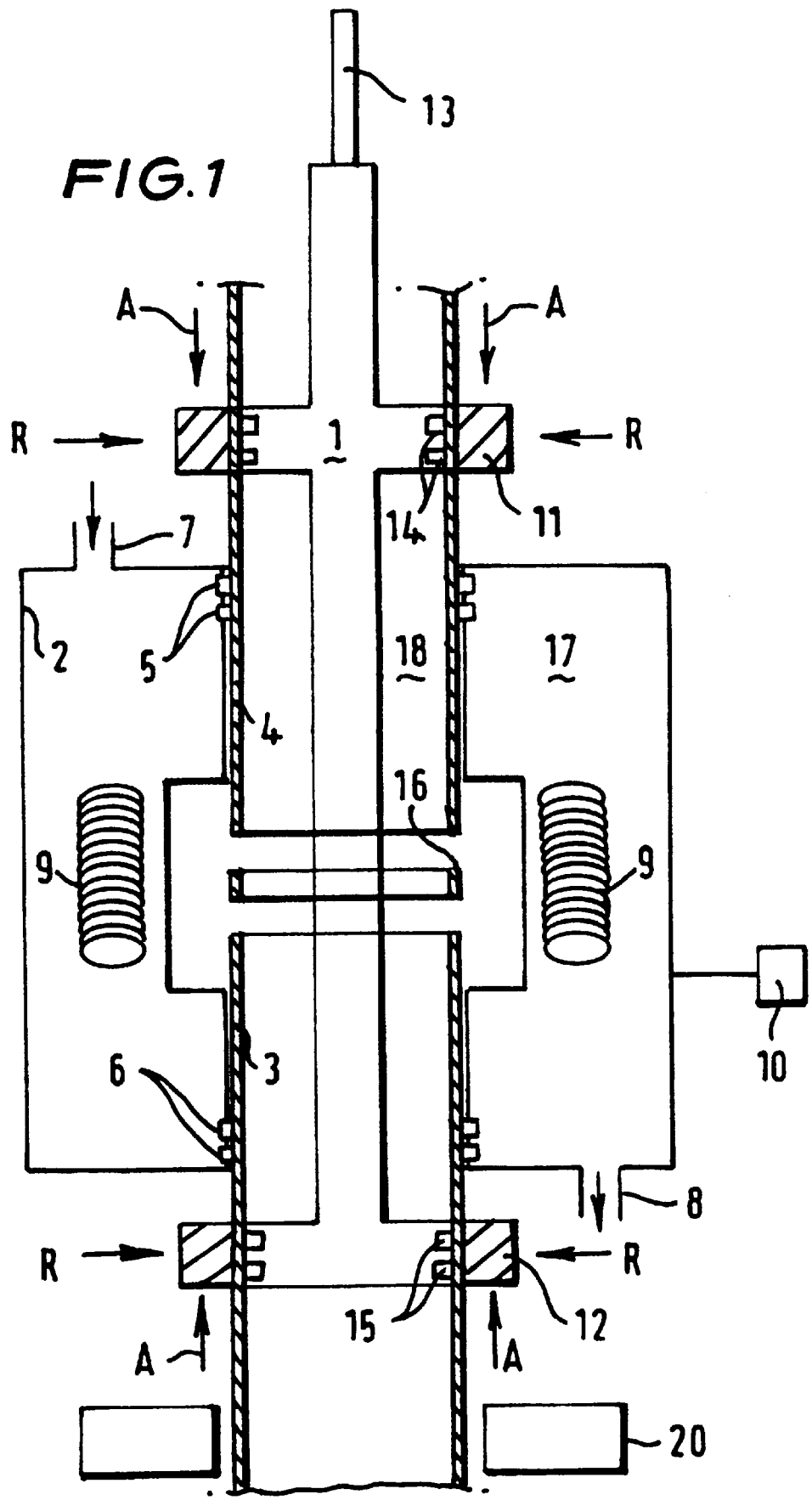
FIG. 1 shows an amorphous bonding device according to the invention.

FIG. 1 shows an amorphous bonding device consisting of a mandrel 1 and an external portion 2 arranged around a first and a second tubular element 3 and 4, respectively, which elements are to be interconnected by the amorphous bonding device to a string of well tubulars.

The external portion 2 of the device consists of a set of sealing elements 5 and 6 for use in maintaining an inert atmosphere in a thus formed external annular chamber 16 at the bonding zone, a means for introducing and removing the inert gas 7 and 8 into and from the external annular chamber 16, an induction heating measurement and control system 9 and 10 and a set of adjustable external clamps 11 and 12 used for aligning the tubular elements and applying axial pressure to the bonded area. The internal mandrel 1 of the device consists of a mandrel that is run into the top tubular element 4 on a hydraulic line 13. The mandrel is at each end equipped with clamp and seal sections 14 and 15. The seals and clamp sections 14 and 15 are hydraulically opened and closed with fluid pressure being supplied by the hydraulic line 13.

A preferred procedure for joining well tubulars using the system shown in FIG. 1 is as follows:

The external portion 2 of the bonding device is mounted or suspended in a substantially vertical position above the wellhead 20 of the well in which the well tubulars are to be inserted, for example to create a casing string or one or more production strings.

The tubular elements 3,4 for use in the string or strings are stored in a slant or vertical orientation in a pipe rack near the wellhead, and the external portion of the bonding device is located above the well (not shown).

A first tubular element 3 is then retrieved from the pipe rack and lowered through the external portion 2 of the bonding device into the well until the upper end of this element is located in a vertical orientation just above the lower clamp 12 of the external portion 2 of the bonding device, whereupon a ring of amorphous material 16 is placed for example on top of the first tubular element 3.

Subsequently the internal mandrel 1 of the device, whilst it is suspended on the hydraulic line 13 carried by for example the crown block of a drilling rig mounted above the well, is lowered through the second tubular element 4 until the mandrel 1 protrudes about halfway from the lower end of this element 4.

Then the mandrel 1 is clamped to the inner wall of the second tubular element by activating the upper clamp/seal assembly 14 of the inner mandrel assembly 1 by using hydraulic fluid energy via the hydraulic line 13, whereupon the mandrel 1, with the second tubular element 4 attached thereto, is hoisted to a vertical position above the first tubular element 3. As a next step the lower part of the mandrel 1 is stabbed through the ring of amorphous material 16 into the upper end of the first tubular element 3 until the lower end of the second tubular element 4 rests upon the amorphous material 16 on the upper end of the first tubular element 3.

Correct orientation of the ends of the tubular elements 3 and 4 is then confirmed and if necessary adjustments are made using the clamp mechanisms 12, 15 and/or 11, 14 to move the elements in relation to each other. After establishing that the abutting ends of the tubular elements 3 and 4 are properly located in coaxial orientations with the amorphous material 16 the external seal mechanism 5, 6 is activated, sealing the external annular chamber 17 around the area to be bonded. Inert gas is then introduced via line 13 into the chamber 17 and within the external sealing mechanism 5 and 6 and simultaneously via line 13 into an internal annular chamber 18 that is formed between the internal seals 14 and 15 at the ends of the mandrel 1. Following the gas purging, the lower seal/clamp assembly 15 is activated by applying hydraulic pressure via line 13 to set the clamp seal 15 against the internal wall of tubing element 3.

Subsequently a high clamping force R is applied to the clamps 11 and 12 of the external assembly 2. As the axial spacing between the external clamps 11 and 12 and the internal clamps 14 and 15 is identical a high radial clamping force may be exerted between the clamps and the walls of the tubular elements 3 and 4 without the risk of deformation or rupture of these elements.

After having thus clamped the mandrel 1 and external portion 2 of the device to the tubular elements 3 and 4 in such a manner that an over pressure of inert gas is present in the external chamber 17 and internal annular chamber 18 to ensure any access of flammable gasses from the well to the region of the bond is prevented and that a clean inert gas system is present around and at the bond area, axial pressure A is applied to the clamps 11, 12 which forces the tubular elements 2 and 3 into intimate contact with the amorphous bonding material 16.

Subsequently the amorphous bond is made by activating the coil 9 to inductively heat the tubular elements 2 and 3 to predetermined temperatures for predetermined times whilst applying predetermined axial pressure A via the clamps 11, 12. Lengths of heating and cooling times together with required pressures to apply are a function of the material to be bonded and will differ for each material. Exact temperature profiles of the materials is monitored and controlled using control instrumentation contained in control system 10.

After creation of the bond a heat treatment of the bond and interconnected ends of the tubular elements 3 and 4 may be carried out carried out by further inductive heating and cooling as required. Pressure testing of the bond is preferably also carried out by utilising the inert gas injection and containment system provided by the annular chambers 17 and/or 18 as previously described. Preferably the cooling of the amorphous bond is carried out by pumping and/or recycling inert gas through the annular chambers 17 and 18. Therefore the annular chambers 17 and 18 contribute to creating a most versatile light weight and mobile amorphous bonding tool which is able to make and inspect an amorphous bond quickly. Typically both annular chambers 17 and 18 will be closed and filled with stationary inert gas during the heating step. During the subsequent cooling step inert gas will be pumped at such a speed through the chambers 17 and 18 that the amorphous bond is cooled at the desired rate. During the subsequent test phase the inert gas pressure in one of the chambers 17 or 18 is elevated to trace any inert gas leakage through any gaps between the bonded surface.

Subsequently the mandrel 1 and external portion 2 of the device are released from the tubular elements 3 and 4 by releasing the internal seal/clamp assemblies 14, 15 and the external seal/clamp assemblies 5, 6 and 11, 12. Subsequently the bonded tubular elements will be lowered using the rig equipment to place the manufactured bond across an e.g. X-ray and/or ultrasonic inspection assembly at or near the wellhead 20. The bond area will be finally inspected by said inspection assembly to check for any flaws in the bond.

A next tubular element or accessory may be connected on top of the second tubular element 4 by repeating the bonding process described above, which process may be repeated again and again until the string of well tubulars has its required length.

In the above described method the amorphous bond material was placed on the first tubular element 3 during the bonding process. An alternative would be that an end of the first and/or second tubular element 3 or 4 is prepared with an amorphous element attached to it prior to placing the tubular elements on top of each other.

In the above described method it has been assumed that the tubular ends have been prepared to tolerances suitable for use in the bonding system. An alternative would be to place the tubular elements 3 and 4 in the amorphous bonding device and firmly clamp them in position using the clamping systems 11, 14, and 12, 15. Once in the system the ends of the tubing could be prepared using a metal milling/dressing system which ensures that the ends of the tubulars are flat and true by milling off a portion of the tubular elements. This milling process could be carried out using milling machinery mounted on an arm (not shown) that swings into position prior to the installation of the mandrel 1 and external portion 2 of the bonding device.

While the foregoing description with reference to the drawing is directed to preferred embodiments of a method and device according to the invention, many variations and modifications may be made in the design and procedure for operating the device without departing from the concept of the present invention.

Thus it will be understood that instead of pumping inert gas into the internal annular chamber 18 via line 13, inert gas may also be pumped into this chamber 18 via the external chamber 17 and the gap between the amorphous ring 16 and tubular ends before the bond is made and before the internal sealing rings that form part of the internal sealing and clamping system 14 and 15 are activated.

It will also be understood that the method and device according to the invention are particularly suitable for making up of both internally and externally flush bonds between well and other oilfield tubulars in a quick, safe and reliable manner.

Accordingly, it should be clearly understood that the device and method depicted in the accompanying drawings and referred to in the foregoing description are illustrative only and are not intended as limitations on the scope of the invention.

What is claimed is:

1. A method for joining oilfield tubulars, the method comprising the steps of:
   providing a first oilfield tubular having an end surface and an inner surface, and a second oilfield tubular having an end surface and an inner surface;
   placing the end surface of said first tubular adjacent to the end surface of said second tubular;
   positioning a body of welding material between said adjacent end surfaces;
   arranging a welding device near said adjacent end surfaces and said welding material, which device is equipped with an internal mandrel, an external clamp mechanism, an external seal mechanism, and an inert gas injection mechanism;
   inducing the external clamp mechanism to press the end surfaces against the body of welding material such that the end surfaces of the tubulars are maintained in an accurately defined axially aligned position relative to each other;
   activating the external seal mechanism to create a sealed external chamber that surrounds the end surfaces of the tubulars and the body of amorphous material;
   activating the inert gas injection mechanism to fill the sealed external chamber with an inert gas;
   heating the body of welding material such that it melts and on cooling a metallurgical bond is created between the end surfaces of the tubulars;
   allowing the joined tubulars to cool down;
   releasing the clamp and seal mechanisms; and
   removing the joined tubulars from the welding device; characterized in that the welding device is an amorphous bonding device which is equipped with an induction heating coil, that the body of welding material is a body of amorphous material which is heated by the induction coil and that the mandrel is equipped with axially spaced seals that are expanded against the inner surfaces of the oilfield tubulars to form a sealed internal annular chamber inside the tubulars which is filled with an inert gas during the step of inducing the heating coil to melt the amorphous material.

2. The method according to claim 1, wherein the oilfield tubulars are well tubulars and the method further comprises the steps of:
   lowering the first tubular into a well until an upper end surface of the tubular is located in a substantially vertical orientation near an entrance of the well;
   hoisting the second tubular to a substantially vertical position above the first tubular whereas a lower end surface of the second tubular is adjacent to the upper end surface of the first tubular;
   positioning the body of amorphous material between the adjacent end surfaces of the first and second tubular element;
   fixing the tubulars in axial alignment with each other using the external clamp mechanism and the internal mandrel which is inserted into the interior of the first and second tubular;
   placing the induction coil and seal mechanism adjacent to the end surfaces to be joined;
   flushing the area to be joined with an inert gas, inducing the external clamp mechanism to press the end surfaces of said tubulars against the body of amorphous material to ensure intimate contact between said end surfaces and the body of amorphous material;
   activating the induction coil to melt the amorphous material and create a metallurgical bond between the tubulars;
   releasing the clamp and seal mechanisms; and
   lowering the interconnected tubulars into the well.

3. The method of claim 2 wherein a non-destructive method is used for testing of the metallurgical bond, which test method includes pumping inert gas at elevated pressure into a sealed annular sealing chamber formed adjacent to the location of the metallurgical bond and monitoring whether any leakage of inert gas from the chamber occurs.

4. The method of claim 2 wherein before and during the step of induction heating of the amorphous material the mandrel is placed inside the tubulars and clamped against their internal surfaces by means of a pair of internal clamps that are expanded against these surfaces at locations opposite to the locations where a pair of external clamps of the device are positioned.

5. The method of claim 2 wherein the second tubular is hoisted to a position above the first tubular by moving the mandrel in a downward direction therethrough, while the mandrel is secured to a hydraulic line, until the mandrel protrudes about halfway from the lower end of the second tubular, whereupon a first clamp is expanded against the second tubular's inner surface and the mandrel wherein the second tubular is lifted by the hoisting cable to a vertical position above the first tubular whereupon a protruding end of the mandrel is stabbed into the first tubular and fixed thereto after a gas purging cycle by expanding a second clamp of the mandrel.

6. A device for joining oilfield tubulars comprising:

an external clamp mechanism and a mandrel that is insertable into the interior of tubulars, each said tubular having an end surface and wherein the end surfaces are placed adjacent to each other, to press the end surfaces against a body of welding material between the tubulars such that the end surfaces are maintained in an accurately defined axially aligned position relative to each other;

an external seal mechanism for creating a sealed external chamber that surrounds the end surfaces and the body of welding material;

an inert gas injection mechanism for filling the sealed external chamber with inert gas;

means for heating the body of welding material such that it melts and on cooling a metallurgical bond is created between the end surfaces of the tubulars; and means for moving the tubulars into and from the device; characterized in that the device is an amorphous bonding device which is equipped with an induction heating coil and that the mandrel is equipped with axially spaced seals that are in use expanded against the inner surfaces of the oilfield tubulars to form a sealed internal annular chamber inside the tubulars during the amorphous bonding process.

7. The device of claim 2 wherein the mandrel is at its upper end connectable to a hydraulic hoisting line.

* * * * *